United States Patent [19]

Jacobsen

[11] Patent Number: 4,804,829

[45] Date of Patent: Feb. 14, 1989

[54] DATA HANDLING SYSTEM

[75] Inventor: Hans Jacobsen, Täby, Sweden

[73] Assignee: International Terminal Systems AB, Danderyd, Sweden

[21] Appl. No.: 51,684

[22] PCT Filed: Aug. 29, 1986

[86] PCT No.: PCT/SE86/00388

§ 371 Date: Apr. 28, 1987

§ 102(e) Date: Apr. 28, 1987

[87] PCT Pub. No.: WO87/01489

PCT Pub. Date: Mar. 12, 1987

[30] Foreign Application Priority Data

Sep. 3, 1985 [SE] Sweden ............................... 8504092

[51] Int. Cl.[4] ............................................... G06K 7/10

[52] U.S. Cl. ..................................... 235/377; 235/375

[58] Field of Search ................................ 235/377, 375

[56] References Cited

U.S. PATENT DOCUMENTS 4,401,994 8/1983 Witts .................................. 235/377
4,409,657 10/1983 Van de Lely ....................... 235/377
4,423,314 12/1983 Kato ................................... 235/377
4,494,127 1/1985 King .................................... 235/377
4,536,646 8/1985 Adams ................................ 235/377

*Primary Examiner*—Harold I. Pitts
*Attorney, Agent, or Firm*—Nies, Webner, Kurz & Bergert

[57] ABSTRACT

A data handling terminal includes a microcomputer and a memory, the microcomputer preferably being intended for connection to a central computer. The data handling terminal (1) is characterized in that it includes a feed path (5) arranged to advance a so-called time card (29), in that arranged along the path (5) is a reader (18), which is arranged to read a bar code (30), a printer (19) and a sensor (21), which is arranged to transmit a signal to the microcomputer (2) when the time card (29) occupies a pre-determined position in relation to the printer (19). The terminal is further characterized by a first control circuit which is arranged to control the printer (19) in response to signals arriving from the microcomputer, and by an identifying device which is arranged to read a code individual to a respective employee, and in that the microcomputer is arranged to store in the memory information corresponding to the bar code (30), the bar code and information printed by the printer (19) containing the time concerned.

2 Claims, 1 Drawing Sheet

DATA HANDLING SYSTEM

BACKGROUND OF THE INVENTION

The present invention relates to a data handling system for collecting data relating to workshop activities, such as time-study work measurements, the names of personnel responsible for having carried out work, and like data.

When practising the known and usual procedure in this regard, the work to be carried out in the workshop is first structurized and the various tasks then allotted to various workmen which when commencing their respective tasks are given a time card or work card, which they stamp in a calculator time clock. The time card is also stamped when work is finished, or during breaks in a working period.

When the work allotted is completed, the planning department calculates the total time taken as recorded on the time card. It is highly essential that an engineering or production company is able to compare the total time taken to complete a specific task with a calculated or estimated total time, in order to be able to follow up and change the costs calculated, since these costs form the basis of the company's invoicing or billing and/or the calculated manufacturing costs.

There are two reasons why it is essential to retain the time card. One reason is that the card has recorded thereon data relating to the work to be carried out, and hence the card serves as an instruction sheet and also as a memorandum for the workman concerned. The other reason is because the time card constitutes a document which records the time worked and which can be used to check that the wages of respective workmen have been calculated correctly.

One paramount disadvantage with the described methodology, however, is that the task of manually compiling the information relating to the times (hours, minutes) recorded on the time card together with the respective work load, and then comparing, more or less manually, the estimated time for carrying out the work concerned with the actual time taken and calculating the respective wages is highly time consuming.

SUMMARY OF THE INVENTION

The present invention overcomes this drawback while enabling the time card to be retained.

Thus, the present invention relates to a data handling terminal comprising a microcomputer, which is preferably intended for connection to a central computer, and a memory, the system being characterized in that it further comprises a time-card feed path, a card reader arranged along said path and operative to read a bar code installed on the card, a printer, and a sensor arranged to send a signal to the microcomputer when the time card is located in a pre-determined position in relation to the printer; in that the terminal incorporates a control circuit for controlling the printer in response to signals from the microcomputer; in that an identifying means is provided for reading a code individual to respective employees; and in that the microcomputer is programmed to store in said memory information corresponding to said bar code, said identification code, and information concerning relevant time entries printed by the printer.

BRIEF DESCRIPTION OF THE DRAWING

An exemplifying embodiment of the invention will now be described in more detail with reference to the accompanying drawing, in which.

BRIEF DESCRIPTION OF THE PREFERRED EMBODIMENTS

Figure 1:
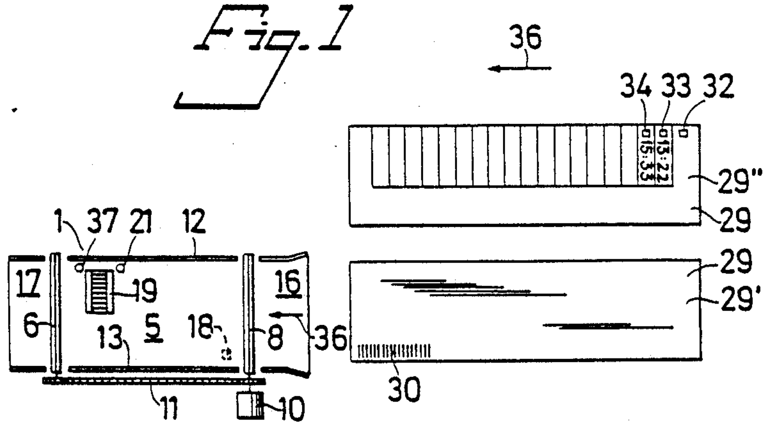
FIG. 1 is a schematic plan view of part of the interior of a data handling system.
Figure 2:
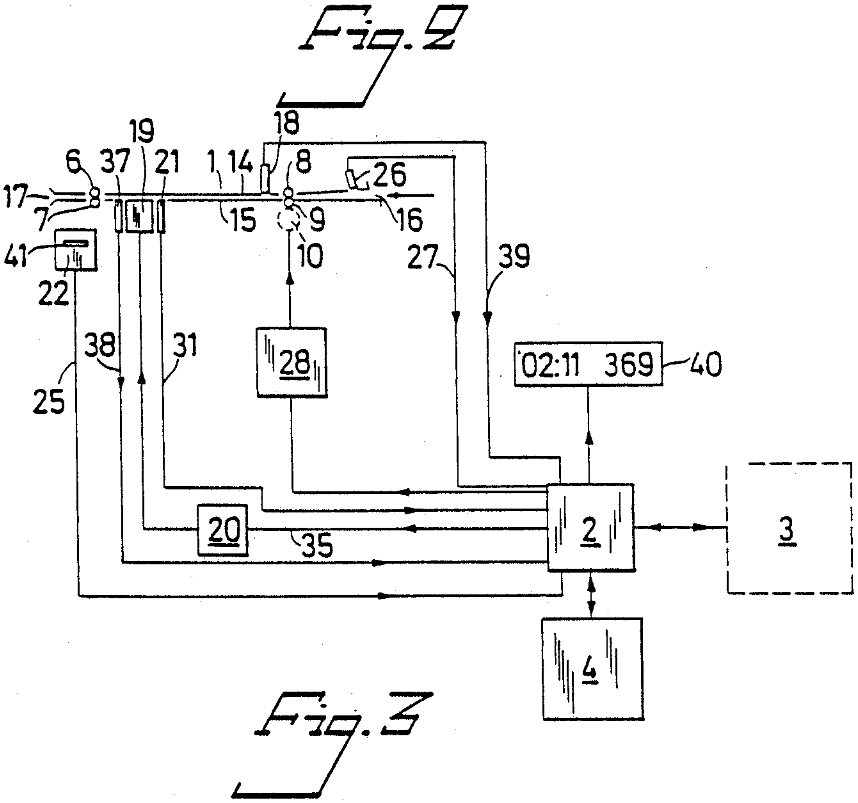
FIG. 2 illustrates schematically and in side view a part of the interior of a data handling system, and also a block schematic.

FIGS. 1 and 2 illustrate a data handling system 1 constructed in accordance with the invention.

The system 1 incorporates a microcomputer 2 which is preferably intended for connection to a central computer 3 and which includes a RAM-type memory 3. The system 1 also incorporates a feed path, generally referenced 5, which is intended to feed a so-called time card through the system 1. The feed path 5 is of conventional construction and may, in principle, be of the same kind as, for example, the feed paths intended for advancing punched cards. The feed path 5 includes pairs of driven rollers 6,7; 8,9. The rollers 6–9 are driven by a motor 10 and are connected, for example, by a toothed belt 11. The feed path 5 is defined by lateral guides 12,13 and by defining plates 14,15, between which a time card is intended to be fed. A time-card infeed aperture 16 and a time-card outfeed aperture 17 are also provided.

Arranged along the feed path 5 is a reader 18 which is arranged to read a bar code incorporated on the card. The reader comprises, for example, a light diode and a phototransistor, i.e. has the form of a conventional reading pen. The system, or terminal, also includes a printer 19 for printing information onto a time card advanced along the feed path. This information, or data, primarily consists of the date and the time (hours, minutes), although other data may also be printed on the card. The printer 19 is controlled by means of a control circuit 20, which in turn is controlled by the microcomputer 2. Arranged in the close proximity of the printer 19 is a sensor 21 which is intended to send a signal to the microcomputer 2 when the time card occupies a predetermined position in relation to the printer 19, as described below.

Figure 3:
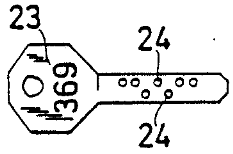
FIG. 3 illustrates a key.

The data handling terminal also includes an identifying device 22 which is intended to read-off the individual code of each employee. To this end the identifying device includes a sensor arrangement for examining a key personal to each employee, such as a card provided with a magnetic strip, or a card having punched therein a series of holes representing an individual code. For example, there can be used a key of the kind illustrated by the key 23 in FIG. 3, which may be a metal key provided with a plurality of holes 24 so orientated as to form a personal code corresponding to the personal number of the employee, this number being exemplified by the numerals 369 in FIGS. 2 and 3. The sensor arrangement 22 is provided with a slot 41 for insertion of the key 23 and incorporates an optical reader for reading the particular pattern of the holes 24 and sending a signal to the microcomputer 2, on a line 25, in response thereto.

The system also includes an optical sensor 26 of some suitable known kind, for sending a signal to the microcomputer 2, on line 27, when a time card is inserted into the infeed aperture 16. The drive motor 10 is controlled by the microcomputer 2 via a control circuit 28. Upon receiving a signal from the sensor 26, the microcomputer actuates the control circuit 28 so as to start the motor 10, and therewith the drive mechanism 6–9 of the feed path.

FIG. 1 illustrates schematically both the upper side 29' and the underside 29" of a time card 29. The time card is printed-out by a data printer in response to an order received from a central computer 3 used to plan the work to be carried out in the workshop. In this regard, there is printed on the upper side 29' of the time card such information as the production order, cost centre, cost accounting by product, estimated (calculated time, etc. This data is stored in the central computer together with an order number. The order number can also be recorded in visible text on the time card.

When practising the present invention, the printer prints out the order number, or some other identification number, on the upper side 29' of the card, in the form of a bar code 30. In this regard, access to all the data printed on the upper side 29' of the time card can be obtained by simply feeding the number contained in the bar code into the central computer.

The under side 29" of the time card 29 is intended to receive the date and the time printed by the printer 19. The time recorded is the time at which respective employees begin and finish the work to which the production order found on the card relates. The time (hours, minutes) shall be printed in a successive order, from one short side of the card to the other. This is exemplified in FIG. 1 by the recorded time 13:22 at which work was commenced and the time 15:33 at which work ceased. The aforementioned sensor 21 for disclosing when the time card occupies a pre-determined position in relation to the printer 19 is an optical sensor of some suitable kind intended for sending a signal to the microcomputer 2, via a line 31, when a mark, such as a spot, on the time card 29 passes the sensor 21 as the time card 29 moves along the feed path 5. To this end, the time card is provided with a pre-printed spot and the printer 19 is arranged, when a time is printed on the card, also tc print a spot 33:34 on the same line as that on which the time is printed. According to one preferred embodiment of the invention, the sensor 21 is located at a distance from the type of the printer, seen in the feed direction of the card, corresponding to a line spacing on the underside 29" of the card.

This means that when the time card is introduced into the feed path 5 for the first time, the card is advanced until the pre-printed spot 32 is detected, at which point the sensor 21 sends a signal to the microcomputer. The microcomputer is programmed to transmit, in response thereto, a signal to the control circuit 20, via a line 35, for activation of the printer 19, this signal containing data relating to the time of day. According to one preferred embodiment, the printer is of the kind provided in tape-printing minicomputers. When the control circuit 20 receives the aforesaid signal, the printer prints the time concerned, e.g. 13:22 hours, together with the spot 33. The date is also preferably printed. The next time the time card is fed-in in the direction of arrow 36 a signal is transmitted by the sensor 21 upon detecting the spot 33, whereupon the printer again prints the time concerned, e.g. 15:33 hours, together with the spot 34. This sequence can be repeated until the card is full, this state of the card being indicated by means of a further optical sensor 37 of the same kind as the aforesaid sensor 26 in the infeed opening. When the microcomputor 2 receives no signal from the sensor 37, via the line 38, i.e. indicating that the time card is not located in the position of the sensor 37, at the same time as the sensor 21 has indicated a spot on the time card, the microcomputer is programmed not to actuate the printer, so as not to print the time on the time card. In this event, the microcomputer is programmed to actuate instead the control circuit 28 of the drive motor 10 in a manner to feed the card back through the infeed aperture 16, i.e. in a direction opposite to that shown by the arrow 36, therewith indicating to the empolyee that his/her time card cannot be stamped.

Correspondingly, the microcomputer may be programmed to feed the card back through the infeed aperture 16 should, for example, the bar code be found defective or should the indicating device fail to identify a valid employee number. The microcomputer 2 is preferably arranged to actuate the control circuit 28 for controlling the drive motor 10 to start the motor when the sensor 26 at the infeed aperture 16 gives a signal to the microcomputer, which is done when a time card is inserted in the aperture 16.

According to a preferred embodiment the microcomputer 2 is further arranged to control the control circuit 28 so that the drive motor 10 stops when the microcomputer receives a signal from the sensor 21. When the printer 19 prints onto a time card the date, time (hours, minutes) and a spot, the microcomputer is programmed to actuate the control circuit 28 to start the drive motor 10, whereupon the card is returned through the outfeed aperture 17. As beforementioned, the reader 18 reads the bar code when the card is inserted. The resultant signal produced in the reader is transmitted to the microcomputer 2 via a line 39. The contact of the bar code 30 is, in this way, stored in the memory 4. In order for the microcomputer to transmit signals to the control circuit 20 instructing the circuit to effect printing of the relevant date and time, it is necessary for an employee to identify himself by means of the aforesaid key 23. Thus, the microcomputer is programmed not to transmit a signal to the control circuit 20 for printing the relevant date and time until firstly a signal has been received from the sensor 21, secondly a signal has been received from the sensor 37, and thirdly a signal has been received from the identifying device 22, this signal in coded form, identifying the employee, for example through his/her personal number. In this respect, the microcomputer is also constructed to store the personal employment number of the employee and the date and time which are printed in the memory 4 in a manner such as to connect this data to the stored bar code.

Thus, the memory 4 has stored therein the bar code, the personal employee number, and the clocking-in and clocking-out time for each work order.

The information stored in the memory is then transferred, either intermittently or continuously, to the central computer 3, in which information relating to data recorded on the upper side 29' of each time card is already found. Thus in this respect, both wages and calculation deviations etc. can be computed in the central computer.

In order to show to the employee what the terminal intends to print, a display 40 is connected to the microcomputer. The microcomputer 2 is programmed to present on the display 40 the personal employee number identified by means of the identifying device 22, and also, e.g. the time (hours, minutes) or the length of time which has passed since the last time the card was stamped, in the illustrated example 2 hours 11 minutes. This latter information may cause the employee to recollect that, for example, he has forgotten to clock out when taking a longer break in the working period.

It is quite obvious that the present invention fulfills the objects stated in the introduction and solves the problem related to manual handling of the data concerned.

The above description has been made with reference to an examplifying embodiment of the invention. Thus, the requisite markings, spots, can be printed on the card in another printer, and the sensors can be arranged in a manner different to that illustrated and described, while the feed path may also be different to that described. Similarly, the microcomputer 2 may also be arranged to control the printer for the time card, i.e. may incorporate totally or partially the computer capacity and memory capacity illustrated by the central computer 3.

Consequently, the present invention shall not be considered to be limited to the aforedescribed and illustrated example, since modifications can be made within the scope of the following claims.

I claim:

1. A data handling terminal comprising: a microcomputer which is intended for connection to a central computer, and a memory, said data handling terminal (1) includes; feed path (5), intended for advancing a so-called time card (29); and along the feed path (5), a printer (19) and a sensor (21), said sensor being arranged to transmit a signal to the microcomputer (2) when a time card (29) occupies a pre-determined position relative to said printer (19); said data handling terminal also comprising a first control circuit (20) arranged to control said printer (19) in response to signals received from said microcomputer (2), and said data handling terminal further comprising an identifying device (22) arranged to read from a code device, a code individual to a respective employee; and wherein said microcomputer (2) is arranged to store in said memory (4), information corresponding to said employee code together with information printed by the printer (19), including the time concerned, the improvement comprising, in said data handling terminal, said sensor (21) which is arranged to transmit a signal when a mark, such as a spot (32–34), included on the time card (29) is detected by said sensor during passage of the time card along said feed path (5); and that said sensor (21) is arranged to transmit said signal to said microcomputer (2), which is thereupon programmed to transmit a signal containing information relating to the time in question to said first control circuit (20), said control circuit (20) being arranged to thereupon actuate said printer (19) so as to print the time concerned on the time card (29) together with a further correlated said mark spot (33;34), of the first mentioned mark spot type, which last mentioned mark spot is used for positioning the time card the next time the card is inserted into the data terminal whereby said last mentioned mark spot is sensed by said sensor (21).

2. A data handling terminal according to claim 1, further including a bar code reader (18) located along said feed path (5), said reader being located and arranged to read a bar code (30) included on said time card.

* * * * *